United States Patent [19]

Kreutzer et al.

[11] Patent Number: 5,319,530
[45] Date of Patent: Jun. 7, 1994

[54] HOOD FOR A UNIDIRECTIONAL LAMP

[75] Inventors: Robert E. Kreutzer, Columbia, Ill.; Steven A. Rose, St. Louis; Andrew G. Smith, Chesterfield, both of Mo.

[73] Assignee: Public Safety Equipment, Inc., St. Louis, Mo.

[21] Appl. No.: 116,914

[22] Filed: Sep. 7, 1993

Related U.S. Application Data

[63] Continuation-in-part of Ser. No. 878,004, May 1, 1992.

[51] Int. Cl.$^5$ .............................................. B60Q 1/26
[52] U.S. Cl. .................................. 362/80.1; 362/83.3; 362/282
[58] Field of Search ............... 362/80, 80.1, 80.3, 362/293, 282, 283, 226, 74

[56] References Cited

U.S. PATENT DOCUMENTS

| | | |
|---|---|---|
| 1,591,567 | 7/1926 | Shinn . |
| 2,106,995 | 2/1938 | Clary ................................. 240/41.1 |
| 3,462,591 | 8/1969 | Pichard ............................... 240/1.3 |
| 4,069,415 | 1/1978 | Dacal .................................. 362/263 |
| 4,833,579 | 5/1989 | Skegin ................................. 362/362 |
| 4,858,082 | 8/1989 | Hayward ............................. 362/74 |
| 4,912,607 | 3/1990 | Kocsi et al. .......................... 362/74 |
| 4,991,063 | 2/1991 | Stoneham ............................. 362/18 |
| 5,061,055 | 10/1991 | Dubé .................................. 359/862 |

OTHER PUBLICATIONS 1988, 1-page brochure entitled Dash-Master Strobe sold by Whelen Engineering Company.
1990, 1-page brochure entitled Khaii emergency/warning light-Pro-Strobe IV sold by Khaii Limited.
1988, 1-page brochure entitled Deck-Master sold by Whelen Engineering Company.
Three sheets of color copies of photographs of Playskool ® Flashlight.

*Primary Examiner*—Ira S. Lazaros
*Assistant Examiner*—Sara Sachie Raab
*Attorney, Agent, or Firm*—Senniger, Powers, Leavitt & Roedel

[57] ABSTRACT

A hood for mounting a unidirectional lamp adjacent a window, such as a windshield, of an emergency vehicle and within a passenger compartment of the vehicle for directing light through the window. The lamp includes a housing having a forward portion defining an opening therein, a light source within the housing, and a lamp lens adjacent the forward portion of the housing and covering at least a portion of the opening for directing light from the light source through the opening. The hood comprising a hood body mountable adjacent the window having a rearward end defining a first open port dimensioned for receiving the forward portion of the housing, a forward end defining a second port opposite the first port, and a light pathway between the first and second ports for transmission of a beam of light from the light source through the body. A hood lens is within the body for optically altering the beam of light transmitted along the light pathway. The hood lens is moveable between an aligned position within the light pathway in which the beam of light being transmitted along the light pathway is transmitted therethrough and is optically altered thereby, and a nonaligned position in which the beam of light being transmitted along the light pathway is not transmitted through the hood lens.

20 Claims, 5 Drawing Sheets

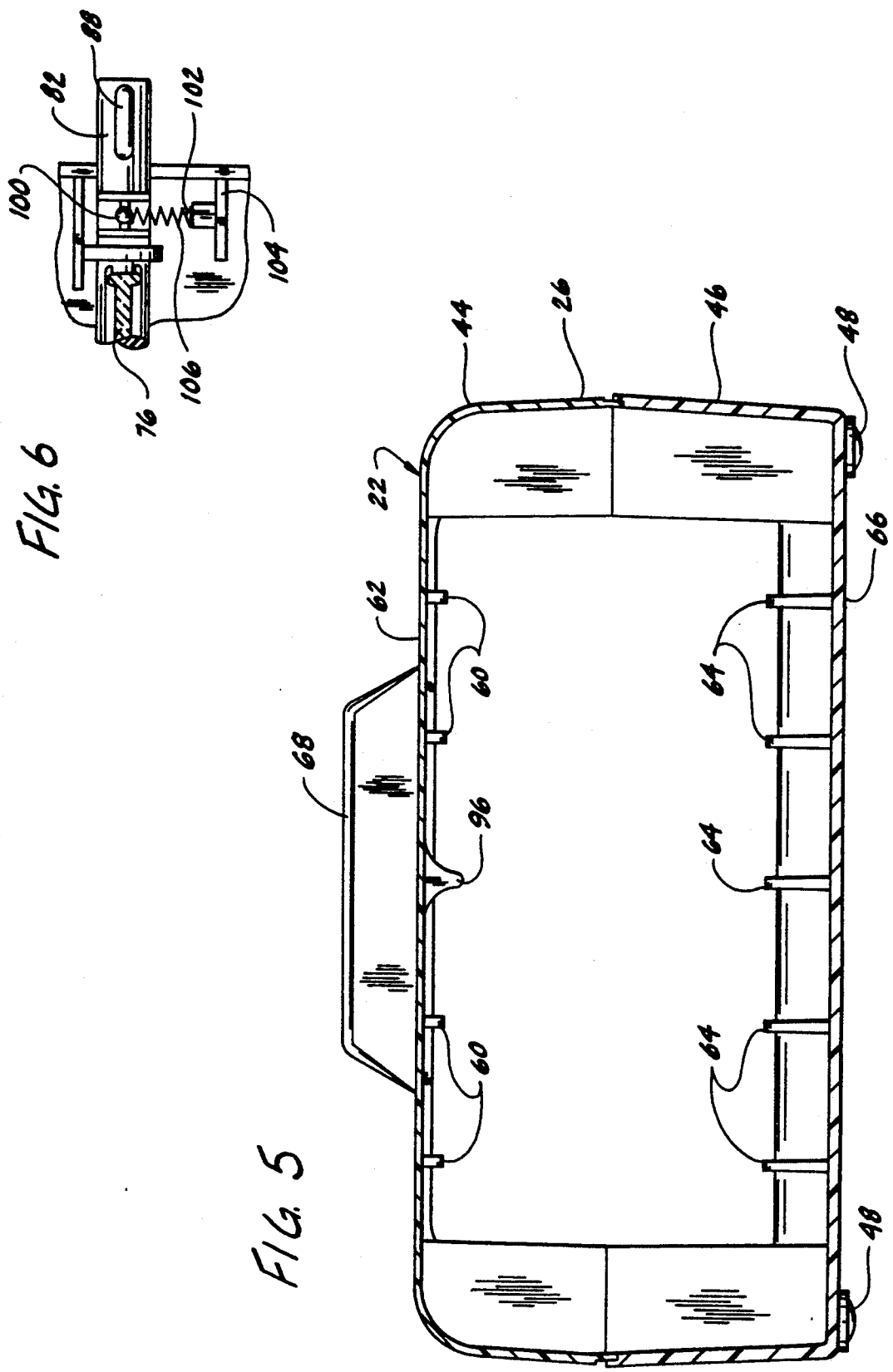

HOOD FOR A UNIDIRECTIONAL LAMP

This is a continuation-in-part of design application Ser. No. 07/878,004, filed May 1, 1992.

BACKGROUND OF THE INVENTION

This invention relates generally to lamp assemblies and, more particularly, to hoods for holding emergency warning lamps used in emergency vehicles.

Some lamps used in emergency vehicles are capable of operating in both a steady-burn mode and in a flashing mode. Such a lamp generally has a housing, a light source within the housing, a suitable reflector for reflecting light from the light source through an opening in the housing, and a lens covering the opening. The lamp may be releasably mounted to the dashboard of the emergency vehicle so that light from the lamp may be transmitted through the windshield. If the lamp is to be used as an emergency warning lamp, the lens will preferably be colored red, blue, or amber, and the user will generally operate the lamp in the flashing mode. If the lamp is to be used as a searchlight, the lens will preferably be clear so that the lamp transmits white light, and the user will generally operate the lamp in the steady-burn mode. A disadvantage of such lamp is that it cannot be readily switched from use as an emergency warning light (e.g., having a lens of a particular color and/or with refractive elements) to a searchlight (e.g., having a clear smooth lens). Thus, in operation, such lamp is generally used as a dedicated warning light or a dedicated searchlight.

SUMMARY OF THE INVENTION

Among the several objects of this invention may be noted the provision of an improved light assembly; the provision of such a light assembly which even in emergency situations can practicably be used as both an emergency warning light and a searchlight; the provision of such a light assembly in which the optical characteristics of light transmitted therefrom may be readily altered; the provision of such a light assembly which, when mounted to the interior of an emergency vehicle, is capable of operation in one of two preselected optical modes, one of which optically alters a beam of light transmitted from the light assembly; the provision of such a light assembly having a lens readily moveable between a first position in which a beam of light from the light assembly passes through the lens and is optically altered thereby and a second position in which the beam of light does not pass through the lens; the provision of such a light assembly which is of a durable and light-weight construction; and the provision of such a light assembly which is economical to manufacture.

Generally a hood in accordance with the present invention is adapted for mounting a generally unidirectional lamp adjacent a window, such as a windshield, of an emergency vehicle and within a passenger compartment of the vehicle for directing light through the window. The lamp includes a housing having a forward portion defining an opening therein, a light source within the housing, and a lamp lens adjacent the forward portion of the housing and covering at least a portion of the opening for directing light from the light source through the opening. The hood comprises a hood body mountable adjacent the window and a hood lens within the hood body. The hood body has a rearward end defining a first open port dimensioned for receiving the forward portion of the housing, a forward end defining a second port opposite the first port, and a light pathway between the first and second ports for transmission of a beam of light from the light source through the body. The hood lens is for optically altering the beam of light transmitted along the light pathway. It is moveable between an aligned position within the light pathway in which the beam of light being transmitted along the light pathway is transmitted therethrough and is optically altered thereby, and a nonaligned position in which the beam of light being transmitted along the light pathway is not transmitted through the hood lens.

In another aspect of the present invention, a light assembly is adapted for being mounted adjacent a window, such as a windshield, of an emergency vehicle, for directing light through the window. The light assembly includes a lamp, a hood body, and a hood lens. The lamp includes a housing having a forward portion defining an opening therein, a light source within the housing, and a lamp lens adjacent the forward portion of the housing and covering at least a portion of the opening for directing light from the light source through the opening. The hood body is mountable adjacent the window and has a rearward end defining a first open port dimensioned for releasably receiving the forward portion of the housing, a forward end defining a second port opposite the first port, and a light pathway between the first and second ports for transmission of a beam of light from the light source through the body. The hood lens is within the body for optically altering the beam of light transmitted along the light pathway. The hood lens is moveable between an aligned position within the light pathway in which the beam of light being transmitted along the light pathway is transmitted therethrough and is optically altered thereby, and a nonaligned position in which the beam of light being transmitted along the light pathway is not transmitted through the hood lens.

Other objects and features will be in part apparent and in part pointed out hereinafter.

BRIEF DESCRIPTION OF THE DRAWINGS

FIG. 5 is a sectional view taken along the line 5—5 of FIG. 4; and

FIG. 6 is a partial sectional view taken along the line 6—6 of FIG. 4.

Corresponding reference characters indicate corresponding parts throughout the several views of the drawings.

DESCRIPTION OF THE PREFERRED EMBODIMENTS

Figure 1:
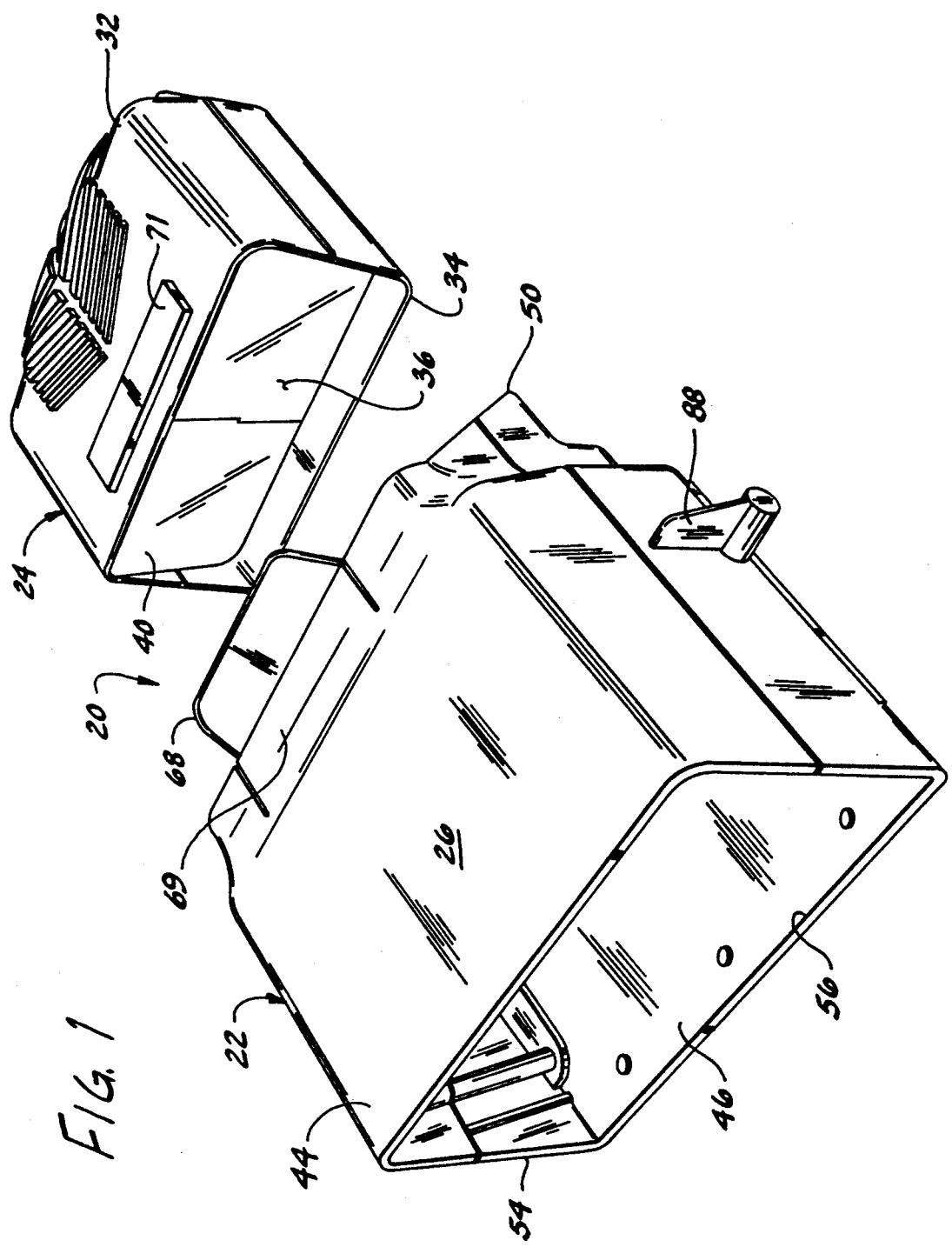
FIG. 1 is an exploded perspective view of a light assembly of the present invention having a lamp and a hood.
Figure 2:
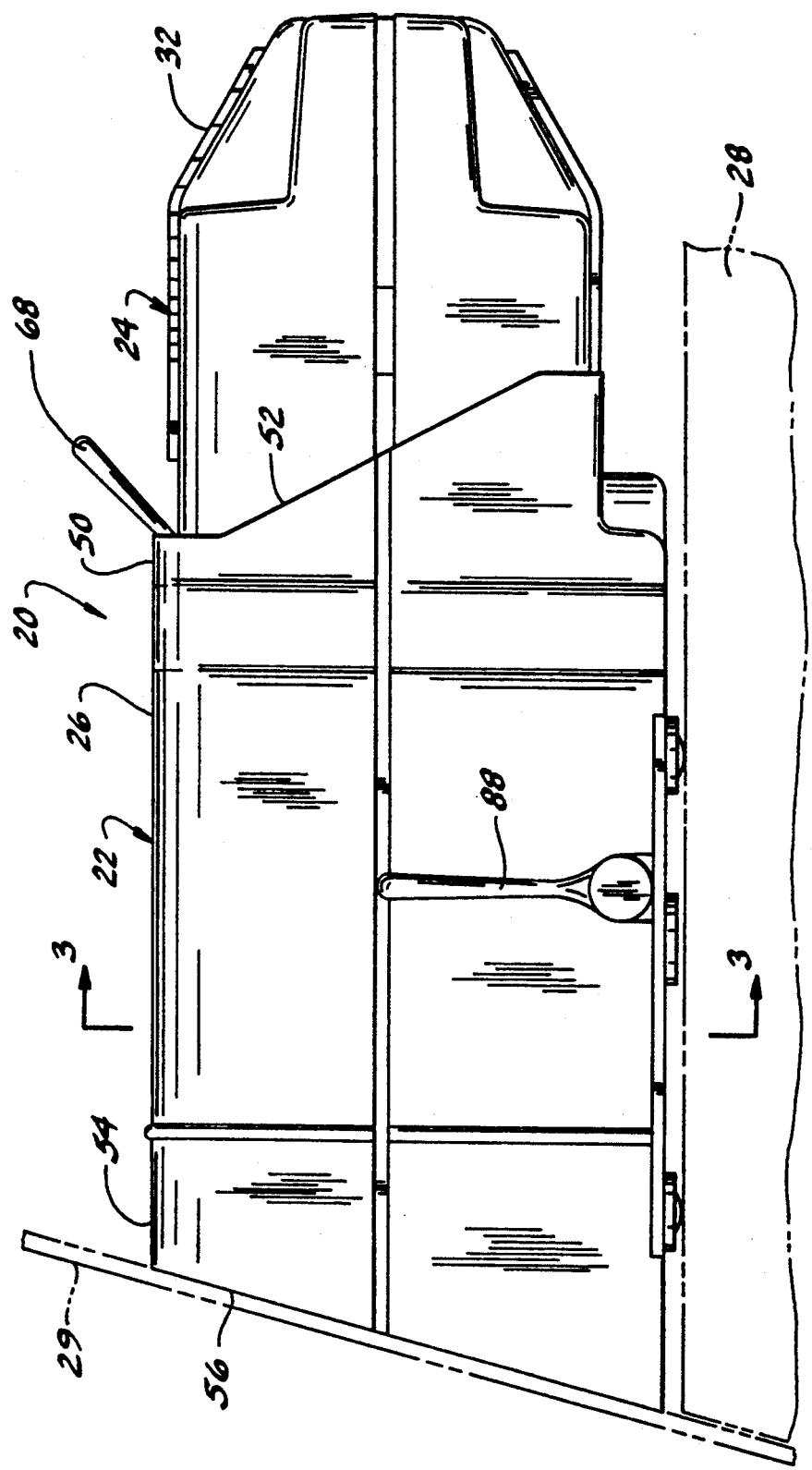
FIG. 2 is a side elevational view of the light assembly of FIG. 1.

Referring now to the drawings, a light assembly of the present invention is indicated in its entirety by the reference numeral 20. The light assembly 20 comprises a hood, generally indicated at 22, and a lamp, generally indicated at 24. The hood 22 includes a hood body 26 adapted to be mounted to a dashboard 28 (see FIG. 2) of an emergency vehicle adjacent a windshield 29, and a hood lens 30 (see FIG. 3) pivotally connected to the hood body. As discussed in greater detail below, the hood body 26 releasably holds the lamp 24 adjacent the windshield 29 within the passenger compartment of the vehicle, and the hood lens 30 optically alters light transmitted from the lamp 24.

The lamp 24 includes a housing 32 having a forward portion 34 defining an opening 36, a light source such as a light bulb 38 (shown in phantom in FIG. 4), and a lamp lens 40 covering the opening 36. Preferably, a parabolic reflector 42 is adjacent the bulb 38 for transmitting a generally unidirectional beam of light through the lamp lens 40. The lamp lens 40 is preferably clear (i.e., colorless) so that light transmitted from the lamp 24 is generally white. The lamp 24 further includes a cord (not shown) for supplying power to energize the bulb 38 and suitable circuitry (not shown) for allowing the lamp 24 to be selectively operated in one of two modes: a steady burn mode in which the lamp emits a constant beam of light energy; and a flashing mode in which the lamp emits light energy intermittently, i.e., in bursts or pulses. The lamp 24 is shown in greater detail in co-pending design application Ser. No. 07/878,004, incorporated herein in its entirety.

Figure 3:
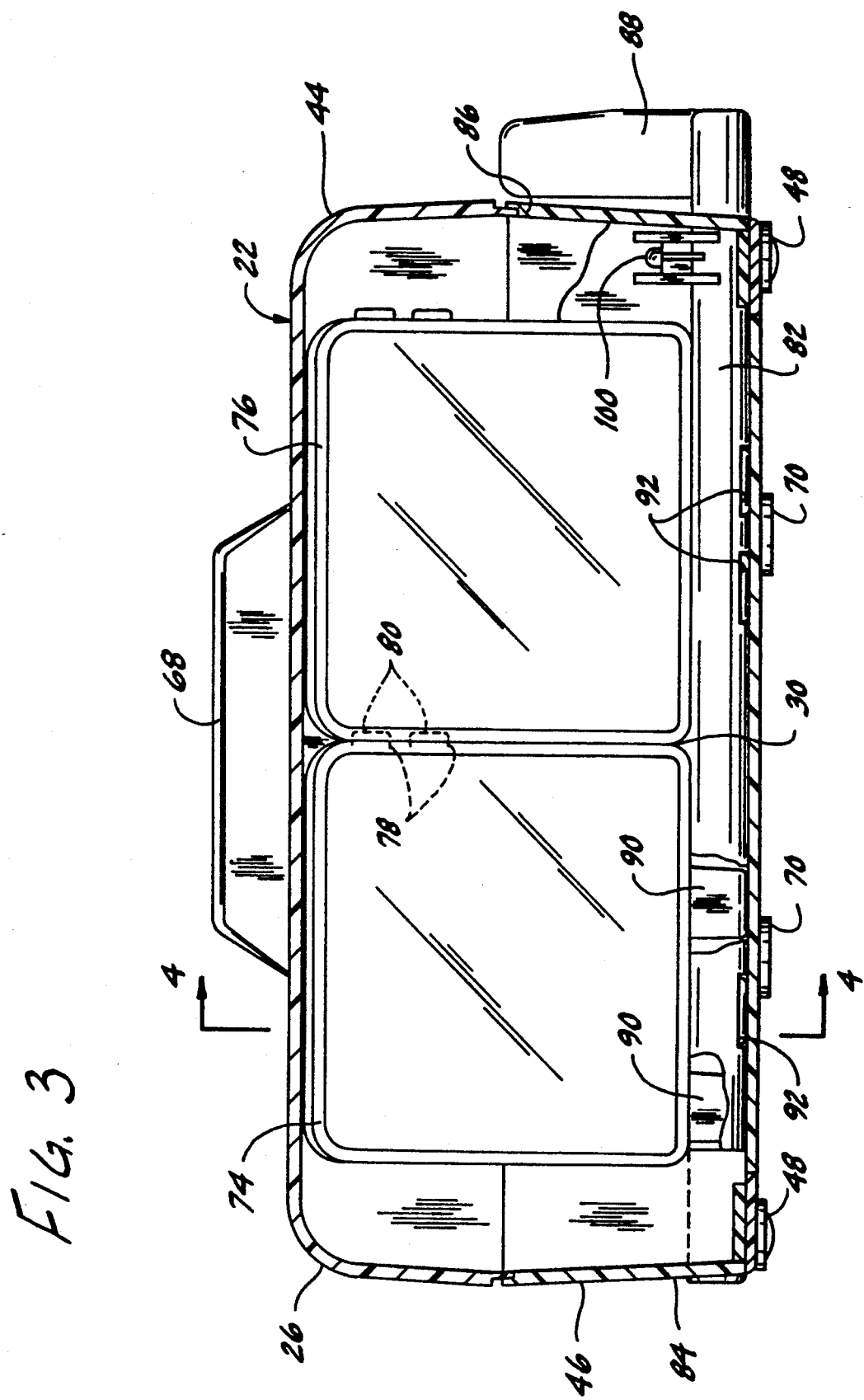
FIG. 3 is a sectional view of the hood of FIG. 1 taken along the line 3—3 of FIG. 2.
Figure 4:
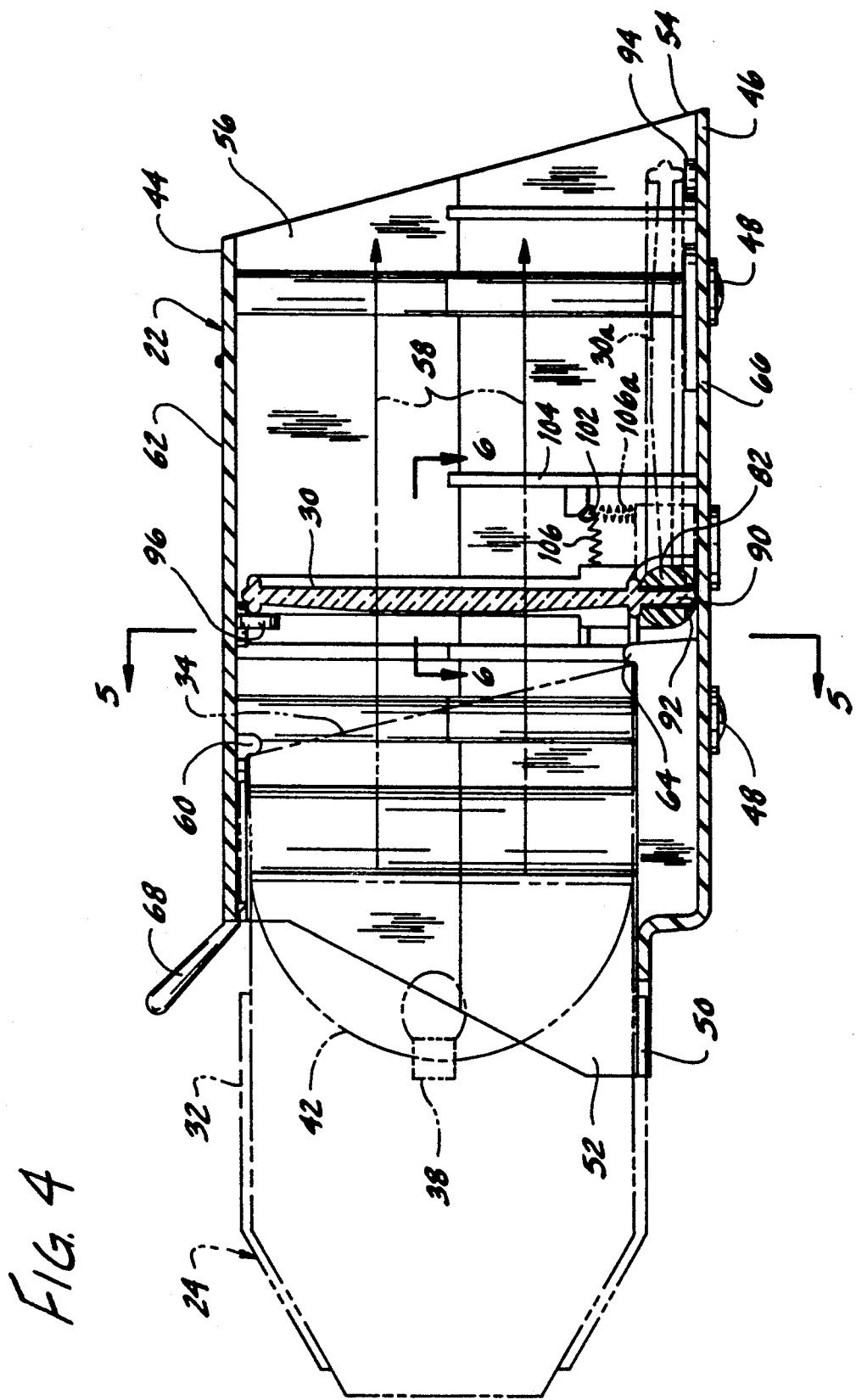
FIG. 4 is a sectional view taken along the line 4—4 of FIG. 3 with the lamp of FIG. 1 shown in phantom.

The hood body 26 has upper and lower shells 44 and 46 secured together by screws 48. The shells 44, 46 are preferably made by injection molding from polycarbonate or other suitable heat-resistant, shock resistant, rigid material. The body 26 has a rearward end 50 defining a first (or rear) open port 52, a forward end 54 defining a second (or front) open port 56 opposite the rear port 52, and a light pathway 58 (see FIG. 4) between the rear and front ports defined by an opening through the hood body 26 through which light from light source 38 passes. The rearward end 50 of the body 26 is configured for a snug telescoping fit of the forward portion 34 of the lamp housing 32 in the rear port 52. The forward end 54 of the body 26 is slanted relative to the light pathway 58 to generally conform to the slant of the windshield 29. The forward end 54 is in close proximity to the windshield 29 generally all around the periphery of the front port 56 to minimize light from the beam of light from reflecting off the windshield and into the passenger compartment. Also, the hood body 26 is preferably opaque so that light will not pass through the walls of the body into the passenger compartment. With the lamp 24 inserted into the rear port 52 and the lamp in operation, the beam of light from the lamp is transmitted along the light pathway 58, through the front port 56, and through the windshield 29. As shown in FIGS. 4 and 5, a first plurality of stops 60 extend downward from an upper wall 62 of the upper shell 44 and a second plurality of stops 64 extend upward from a lower wall 66 of the lower shell 46. The stops 60, 64 are engageable with the forward portion 34 of the lamp housing 32 to limit the extent to which the lamp 24 may be inserted into the rear port 52. The upper wall 62 includes a generally resilient flap 69 adjacent the rear port 52. A protrusion 67 (see FIG. 4) projects downwardly from the flap 69 and is adapted to engage a raised portion 71 on the lamp housing 32. Engagement of the protrusion 67 with the raised portion 71 locks the lamp housing 32 to the hood body 26. An arm 68 extends generally rearwardly and upwardly from the flap 69 to help enable the operator to resiliently flex the flap 69 outwardly to disengage the protrusion 67 from the raised portion 71. The lower wall 66 includes screw bosses 70 (see FIG. 3) so that the hood body 26 may be screwed to a bracket (not shown) secured to the dashboard 28. Although the light assembly 20 is preferably mounted adjacent the windshield, it is to be understood that the light assembly could alternatively be mounted adjacent any other window of a vehicle.

The hood lens 30 is moveable between an upright position (shown in solid in FIG. 4) and a prone position (shown in phantom in FIG. 4 by the reference number 30a). In the upright (or aligned) position, the hood lens 30 extends from the lower wall 66 to the upper wall 62 and spans opposite sides of the hood body 26 so that essentially all light transmitted from the lamp 24 along the pathway 58 passes through the hood lens. In the prone (or nonaligned) position, the hood lens 30 faces and is adjacent the inner surface of the lower wall 66 so that essentially no light transmitted from the lamp 24 along the pathway 58 passes through the hood lens. Preferably, the hood lens 30 is of a suitable color, such as red, blue, or amber, so that in its upright position, the hood lens alters the chromatic characteristics of the white beam of light from the lamp 24 as the beam is transmitted through the hood lens. As a result, beams of colored light are produced. Alternatively or additionally, the hood lens 30 may be configured with optical refractors for spreading the beam of light to widen the area of illumination of the beam. If the hood lens 30 has spreading refractors (diffusers), the beam of light passing through the windshield 29 will illuminate (or more evenly illuminate) a relatively larger area when the hood lens is in its upright position than it will when the hood lens is in its prone position.

The hood lens 30 comprises first and second lens segments 74 and 76. The lens segments are preferably made by injection molding from polycarbonate. A pair of tabs 78 extends laterally from the first lens segment 74 (see FIG. 3) and releasably engages slots 80 in the second lens segment 76 to secure the lens segments together. Preferably, the tabs 78 and slots 80 are configured for a snug fit of the lens segments 74, 76. The lens segments 74, 76 are pivotally mounted to the hood body 26 by a pivot rod 82 extending through opposing side walls 84, 86 of the lower shell 46. A lever arm 88 extends radially from an end of the pivot rod 82, exteriorily of the hood body 26, for allowing a user to readily pivot the rod 82 and lens segments between the lens prone position and the lens upright position. As shown in FIGS. 3 and 4, a plurality of rod engaging tongues 90 extend downward from lower edges of the lens segments 74, 76 and extend into lateral openings 92 along the rod 82. Preferably, the tongues 90 and openings 92 are sized and configured for a snap fit so that the lens segments 74, 76 are held by and rotate with the pivot rod 82. The lens segments 74, 76 may be permanently secured to the pivot rod 82 by a suitable adhesive or by some other means. However, the lens segments 74, 76 are preferably releasably secured to the pivot rod 82 so that the lens segments may be replaced with lens segments of different optical characteristics. For example, the lens segments 74, 76 may be replaced with lens segments of different colors and/or with lens segments having diffusers.

As shown in FIG. 4, the top of the hood lens 30 engages a stop 94 on the lower wall 66 when the hood lens is in its prone position and engages a stop 96 on the upper wall 62 when the hood lens is in its upright position. The lens engaging stops 94, 96 limit movement of the hood lens 30. Preferably, the hood lens 30 is spring loaded for biasing the hood lens in its upright position when the hood lens is in proximity to the upper lens-engaging stop 96 and for biasing the hood lens in its prone position when the hood lens is in proximity to the lower lens-engaging stop 94. Referring to FIGS. 3, 4, and 6, a first spring-engaging prong 100 extends generally radially from the pivot rod 82, and a second spring-engaging prong 102 extends generally rearwardly and downwardly from a panel 104 of the lower shell 46. The prongs 100 and 102 are engaged by opposite ends of a helical spring 106, compressed between the prongs 100 and 102. Regardless of the pivot position, the first prong 100 is positioned below and rearward of the second prong 102. When the hood lens 30 is near its upright position, the spring 106 pushes against the first prong 100 to urge the hood lens 30 rearwardly toward the stop 96. When the hood lens 30 is near its prone position, the spring (shown in phantom in FIG. 4 by the reference numeral 106a) pushes against the first prong 100 to urge the hood lens 30 toward the stop 94. Thus, the hood lens 30 stays in one of its two positions until it is manually moved toward its other position.

In use, the hood 22 is releasably secured to the dashboard 28, interiorly of the windshield 29. The forward portion 34 of the lamp housing 32 is slid into the rearward end 50 of the hood body 26 to the point where the forward portion 34 engages the stops 60, 64. If the hood lens 30 is of a suitable color and the operator desires to use the light assembly 20 as an emergency warning lamp, the hood lens is turned to its upright position to cover the light pathway 58 and the lamp 24 is operated in its flashing mode. Intermittent pulses of light emitted from the lamp 24 along the light pathway 58 pass through the hood lens 30 and are chromatically altered thereby. Thus, light pulses of a desired color radiate forward of the emergency vehicle. If the hood lens 30 also has spreading refractors, the light pulses may radiate from the light assembly 20 at a wide angle. If the operator desires to use the light assembly 20 as a searchlight to illuminate a specific area forward of the vehicle, the hood lens 30 is flipped to its prone position below the light pathway 58 and the lamp 24 is operated in its steady-burn mode. Thus, a steady beam of white light transmitted along the light pathway 58 and through the windshield 29 does not pass through the hood lens 30 and is not altered by the lens. If the operator desires to use the lamp 24 as a hand-held searchlight, the operator pushes the arm 68 upward to flex the flap 69 upward so that the protrusion 67 disengages the raised portion 71. The operator then slides the lamp 24 rearward from the hood 22 and points the beam of light at whatever object is desired to be illuminated. Thus, the hood 22 increases the versatility of the lamp 24.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A hood for mounting a generally unidirectional lamp adjacent a window of an emergency vehicle and within a passenger compartment of the vehicle for directing light through the window, the lamp including a housing having a forward portion defining an opening therein, a light source within the housing, and a lamp lens adjacent the forward portion of the housing and covering at least a portion of the opening for directing light from the light source through the opening, the hood comprising:

a hood body mountable adjacent the window having a rearward end defining a first open port dimensioned for receiving the forward portion of the housing, a forward end defining a second port opposite the first port, and a light pathway between the first and second ports for transmission of a beam of light from the light source through the body; and a hood lens within the body for optically altering the beam of light transmitted along the light pathway, the hood lens being moveable between an aligned position within the light pathway in which the beam of light being transmitted along the light pathway is transmitted therethrough and is optically altered thereby, and a nonaligned position in which the beam of light being transmitted along the light pathway is not transmitted through the hood lens.

2. A hood as set forth in claim 1 wherein said hood body is configured for engaging the window generally all around the periphery of the second port for minimizing light from the beam of light from reflecting off the window and into the passenger compartment.

3. A hood as set forth in claim 2 wherein the forward end of said hood body is slanted relative to the light pathway to conform generally to the slant of the window.

4. A hood as set forth in claim 1 wherein the rearward end of said hood body is configured for a snug telescoping fit of the forward portion of the housing in the first port.

5. A hood as set forth in claim 4 wherein the rearward end of said hood body is configured for slidably receiving the forward portion of the housing.

6. A hood as set forth in claim 5 wherein the rearward end of said hood body further comprises a generally resilient flap adapted to be locked to the housing to retain the housing in the hood body.

7. A hood as set forth in claim 1 further comprising means for pivotally mounting the hood lens to the hood body for movement of the hood lens between the aligned and unaligned positions.

8. A hood as set forth in claim 7 wherein the hood lens extends across the light pathway when the hood lens is moved to the aligned position such that substantially all light transmitted along the light pathway is transmitted through the hood lens.

9. A hood as set forth in claim 8 wherein the hood lens comprises at least two colored lens segments releasably secured to said means for pivotally mounting the hood lens to the hood body.

10. A hood as set forth in claim 8 further comprising means for biasing the hood lens in the aligned position when the hood lens is in proximity to the aligned position and for biasing the hood lens in the nonaligned position when the hood lens is in proximity to the nonaligned position.

11. A light assembly adapted for being mounted adjacent a window of an emergency vehicle, for directing light through the window, the light assembly comprising:

a lamp including a housing having a forward portion defining an opening therein, a light source within the housing, and a lamp lens adjacent the forward portion of the housing and covering at least a portion of the opening for directing light from the light source through the opening;

a hood body mountable adjacent the window having a rearward end defining a first open port dimensioned for releasably receiving the forward portion of the housing, a forward end defining a second port opposite the first port, and a light pathway between the first and second ports for transmission of a beam of light from the light source through the body; and a hood lens within the body for optically altering the beam of light transmitted along the light pathway, the hood lens being moveable between an aligned position within the light pathway in which the beam of light being transmitted along the light pathway is transmitted therethrough and is optically altered thereby, and a nonaligned position in which the beam of light being transmitted along the light pathway is not transmitted through the hood lens.

12. A light assembly as set forth in claim 11 wherein said hood body is configured for being in close proximity to the window generally all around the periphery of the second port for minimizing light from the beam of light from reflecting off the window and into the passenger compartment.

13. A light assembly as set forth in claim 12 wherein the forward end of said hood body is slanted relative to the light pathway to conform generally to the slant of the window.

14. A light assembly as set forth in claim 11 wherein the rearward end of said hood body is configured for a snug telescoping fit of the forward portion of the housing in the first port.

15. A light assembly as set forth in claim 14 wherein the rearward end of said hood body is configured for slidably receiving the forward portion of the housing.

16. A hood as set forth in claim 15 wherein the rearward end of said hood body further comprises a generally resilient flap adapted to be locked to the housing to retain the housing in the hood body.

17. A light assembly as set forth in claim 11 further comprising means for pivotally mounting the hood lens to the hood body for movement of the hood lens between the aligned and unaligned positions.

18. A light assembly as set forth in claim 17 wherein the hood lens extends across the light pathway when the hood lens is moved to the aligned position such that substantially all light transmitted along the light pathway is transmitted through the hood lens.

19. A light assembly as set forth in claim 18 wherein the hood lens comprises at least two colored lens segments releasably secured to said mounting means.

20. A light assembly as set forth in claim 18 further comprising means for biasing the hood lens in the aligned position when the hood lens is in proximity to the aligned position and for biasing the hood lens in the non-aligned position when the hood lens is in proximity to the nonaligned position.

* * * * *